(12) United States Patent  (10) Patent No.: US 9,377,833 B2
Qin et al.  (45) Date of Patent: Jun. 28, 2016

(54) ELECTRONIC DEVICE AND POWER MANAGEMENT METHOD

(71) Applicant: VIA TECHNOLOGIES, INC., New Taipei (TW)

(72) Inventors: Shuang-Shuang Qin, Beijing (CN); Xiaolu Yang, Beijing (CN); Chin-Hwaun Wu, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 299 days.

(21) Appl. No.: 13/935,904

(22) Filed: Jul. 5, 2013

(65) Prior Publication Data

US 2014/0115365 A1  Apr. 24, 2014

(30) Foreign Application Priority Data

Oct. 22, 2012  (CN) .......................... 2012 1 0403293

(51) Int. Cl.
*G06F 1/32* (2006.01)
*G06F 1/26* (2006.01)

(52) U.S. Cl.
CPC ................ *G06F 1/3203* (2013.01); *G06F 1/26* (2013.01); *G06F 1/32* (2013.01); *G06F 1/3296* (2013.01); *Y02B 60/1285* (2013.01); *Y02B 60/32* (2013.01)

(58) Field of Classification Search
CPC ....... G06F 1/3203; G06F 1/3296; G06F 1/26; G06F 1/32; Y02B 60/32; Y02B 60/1285
See application file for complete search history.

(56) References Cited

U.S. PATENT DOCUMENTS

| 7,444,524 | B2 * | 10/2008 | Gunther | G06F 1/26 713/300 |
| 7,917,787 | B2 | 3/2011 | Jahagirdar et al. | |
| 8,078,891 | B2 * | 12/2011 | Fletcher | G06F 1/3203 713/178 |
| 8,935,546 | B2 * | 1/2015 | Gunther | G06F 1/20 713/300 |
| 2006/0047986 | A1 * | 3/2006 | Kurts et al. | 713/320 |
| 2006/0107077 | A1 * | 5/2006 | Roth et al. | 713/300 |
| 2007/0079154 | A1 * | 4/2007 | Diefenbaugh et al. | 713/300 |
| 2008/0082841 | A1 * | 4/2008 | Juenemann et al. | 713/300 |
| 2009/0158067 | A1 * | 6/2009 | Bodas et al. | 713/323 |
| 2009/0327553 | A1 | 12/2009 | Fletcher | |
| 2011/0145616 | A1 | 6/2011 | Rychlik et al. | |

* cited by examiner

*Primary Examiner* — Jaweed A Abbaszadeh
*Assistant Examiner* — Brian J Corcoran
(74) *Attorney, Agent, or Firm* — McClure, Qualey & Rodack, LLP

(57) ABSTRACT

A power management method for use in an electronic system is provided. The electronic system has a processor and a power management unit. The method has the steps of: when the processor has entered a low power state and an awakening event occurs, calculating a staying time from the time point the processor enters the low power state till the time point the awakening event occurs, wherein the operation voltage of the processor is at a first voltage level in the low power state; and when the processing starts to exit the low power state according to the awakening event, determining a wait time, during which the operation voltage of the processor is recovered to a second voltage level of a working state from the first voltage level, wherein the first voltage level is lower than the second voltage level.

18 Claims, 11 Drawing Sheets

ELECTRONIC DEVICE AND POWER MANAGEMENT METHOD

CROSS REFERENCE TO RELATED APPLICATIONS

This application claims priority of China Patent Application No. 201210403293.9, filed on Oct. 22, 2012, the entirety of which is incorporated by reference herein.

BACKGROUND OF THE INVENTION

1. Field of the Invention

The present invention relates to a power management system, and in particular, to power management system and power management method capable of controlling the power state of a processor complying with the "Advanced Configuration and Power Interface (hereinafter as ACPI)" specification.

2. Description of the Related Art

ACPI are widely used in current computer systems to allocate system resources and manage the status of each component in the computer system effectively. Functions, such as power management of the system, peripherals, and the processor, and performance management, battery management, temperature management, system event management of the peripherals and the processor, have been defined in the ACPI specification. Further, the software and hardware behavior for implementing the aforementioned functions are also defined in the ACPI specification.

FIG. 1 is a diagram illustrating the power states of a central processing unit (CPU) defined in the ACPI specification. In the ACPI specification, it is defined that the CPU works normally in the working state (e.g. C0 state), such as executing each instruction and task. If the computer system has been idle for more than a certain period of time, the operating system of the computer system may control the CPU to enter one of the low power states, such as states C1~C4. The operating system may determine which state the CPU may enter according to the bus master activity status (BM_STS). The low power states of the CPU defined in the ACPI specification comprise a first low power state (C1 state), a second low power state (C2 state), a third low power state (C3 state), and a more power-saving fourth low lower state (C1 state), wherein the degree of power consumption decreases from state C1 to state C4. In state C2, the CPU merely monitors the accessing operations of the bus master without executing any instructions, wherein the bus master indicates a component having the bus mastership in the computer system, such as the USB controller, the PCI controller, etc. In state C3, the clocking of the CPU is stopped, and the CPU cannot monitor the accessing operations of the bus master. Compared with state C3, the operation voltage of the CPU is lowered in state C4, so that the CPU may stay in a deeper sleep state. For example, the operation voltage of the CPU is 1.0V in state C0, and the operation voltage of the CPU may be lowered to 0.6V or even lower in state C4.

When the operating system of the computer system has detected that there is no operation in the computer system for more than a certain time period, the operating system may control the CPU to enter state C3 or C4, so that the computer system may save power more effectively.

In state C2, if there is an interrupt event generated or the CPU is requested to execute instructions, the CPU may go back to state C0 from state C2. In state C3/C4, if there is an interrupt event or accessing request of the bus master, the CPU may be awakened to state C0 or C2 from state C3/C4.

Since the operation voltage changes, it may take a very long time (e.g. dozens of microseconds) to enter or exit state C4, thereby causing decrement of system performance. In some applications, it may cause problems of user experience due to the long wait time for entering/exiting state C4. For example, since a USB camera has to transmit data frequently, it cannot tolerate the delay caused by the wait time for exiting state C4. In addition, a high-definition audio device is also a common example, and it may cause noise due to the long delay for exiting state C4. In order to solve the aforementioned issues, the computer system may stop the CPU to enter state C4 when using the aforementioned applications, and thus it is evitable that the power consumption of the computer system is increased.

A power management unit (PMU) is usually used to control the power state of the CPU, and it may require an additional voltage regulator may be required to control the CPU to enter state C4. However, in current computer systems, the voltage regulator and the power management unit operate independently, and the power management unit cannot retrieve the status of the voltage regulator. After the CPU exits the low voltage state (e.g. state C4 defined in ACPI), the power management unit has to control the computer system to wait for a sufficiently long, fixed period of time in order to assure that the voltage level of the CPU has recovered to the stable operation voltage of the working state. However, it may usually cause a reduction of computer system performance.

BRIEF SUMMARY OF THE INVENTION

A detailed description is given in the following embodiments with reference to the accompanying drawings.

In an exemplary embodiment, a power management method for use in an electronic system is provided. The electronic system has a processor and a power management unit. The power management method has the steps of: when the processor has entered a low power state and an awakening event occurs, calculating by the power management unit a staying time from the time point the processor enters the low power state till the time point the awakening event occurs, wherein an operation voltage of the processor is at a first voltage level in the low power state; and when the processing starts to exit the low power state according to the awakening event, determining by the power management unit a wait time, during which the operation voltage of the processor is recovered to a second voltage level of a working state from the first voltage level, wherein the first voltage level is lower than the second voltage level.

In another exemplary embodiment, an electronic system is provided. The electronic system comprises: a processor; and a power management unit, wherein when the processor has entered a low power state and an awakening event occurs, the power management unit calculates a staying time from the time point the processor enters the low power state till the time point the awakening event occurs, wherein an operation voltage of the processor is at a first voltage level in the low power state; wherein when the processing exits the low power state according to the awakening event, the power management unit further determines a wait time, during which the operation voltage of the processor is recovered to a second voltage level of a working state from the first voltage level, wherein the first voltage level is lower than the second voltage level.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
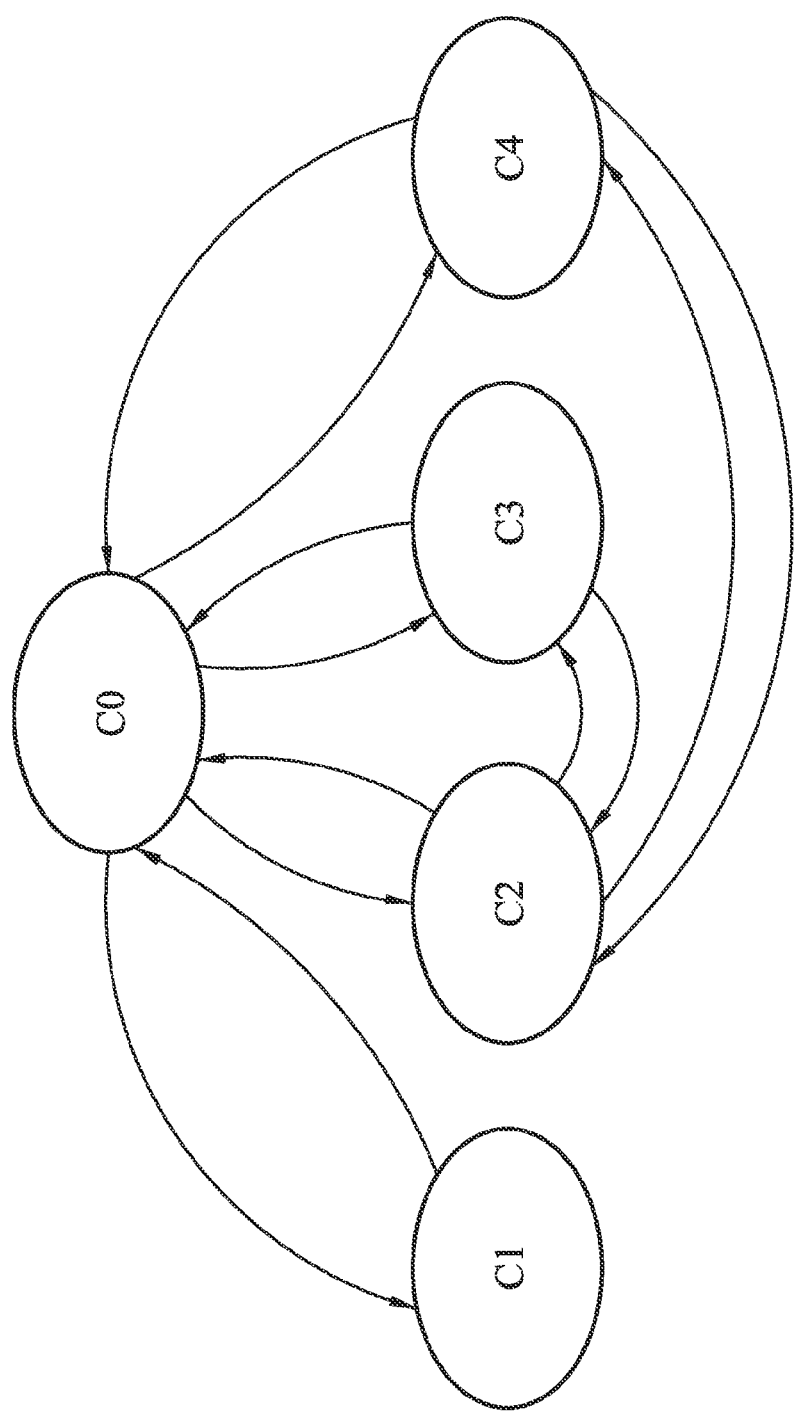
FIG. 1 is a diagram illustrating the power states of a CPU defined in the ACPI specification.
Figure 2:
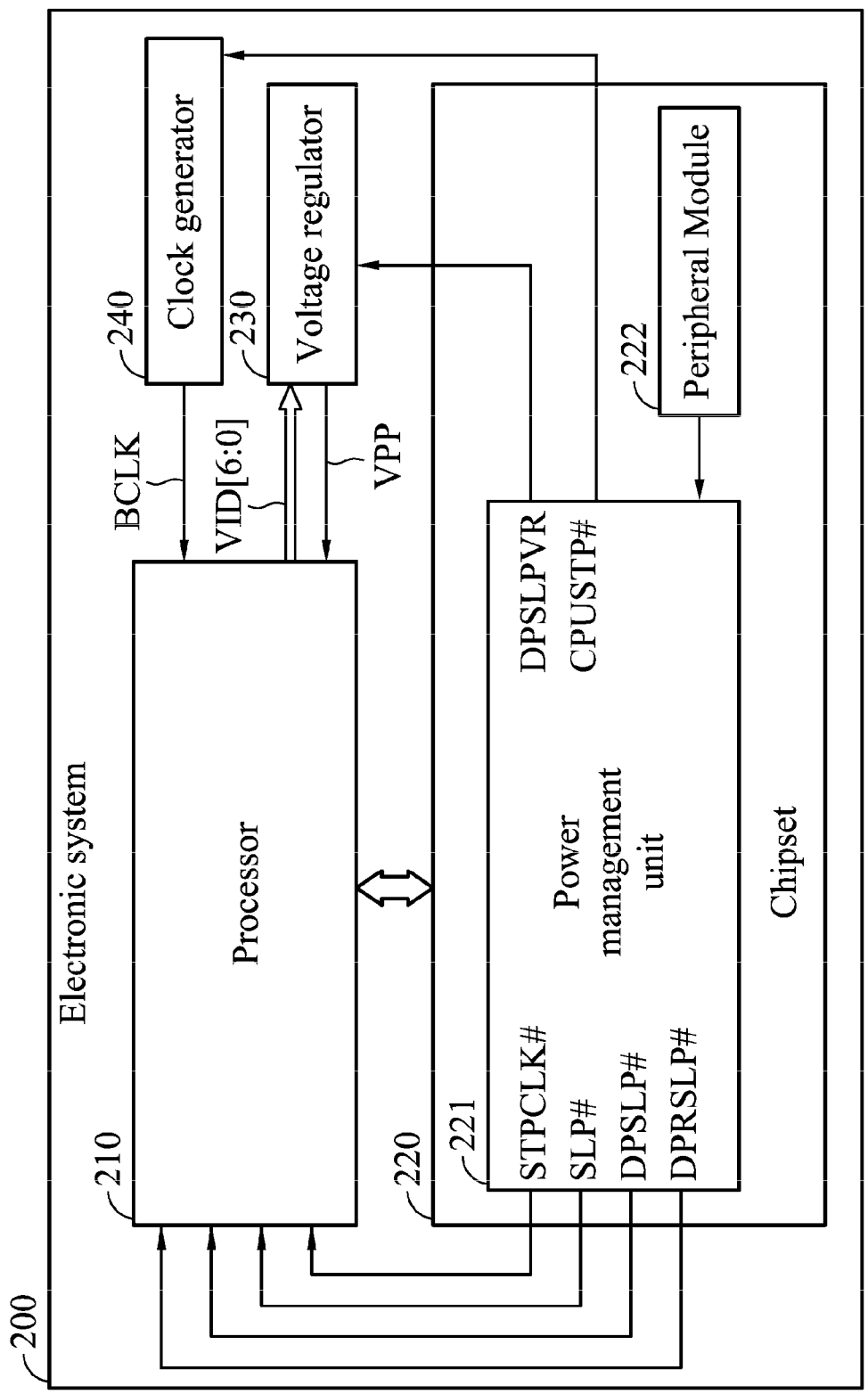
FIG. 2 is a schematic block diagram of an electronic system according to an embodiment of the invention.

FIG. 2 is a schematic block diagram of an electronic system according to an embodiment of the invention. As illustrated in FIG. 2, the electronic system 200 may comprise a processor 210, a voltage regulator 230, a clock generator 240, a power management unit (PMU) 221, and at least one peripheral module 222. The power management unit 221 is coupled to the processor 210, the voltage regulator 230, and the clock generator 240. The peripheral module 222 may be a bus master or an input/output device. For example, the peripheral module 222 may comprise a PCI-E controller, a PCI controller, a USB controller, a high-definition (HD) audio controller, a secure digital input/output (SDIO) controller, a memory card interface controller, and a keyboard/mouse controller. The bus master and the input/output device may be connected to the power management unit 221. Alternatively, each controller may be connected to a bus arbiter, and the bus arbiter is connected to the power management unit 221, but the invention is not limited thereto.

In the following embodiment, an x86 computer system complying with the ACPI specification is used to describe the operation of the invention. Additionally, the invention can be also applied to other electronic systems complying with the ACPI specification, which is capable of control the processor to exit a low power state having a low operation voltage. In an x86 computer system complying with the ACPI specification, the power management unit 221 is included in a chipset 220. The chipset 220 is coupled to the processor 210, the voltage regulator 230, and the clock generator 240. According to the ACPI specification, the processor 210 may enter state C1 with the support of processor instructions (e.g. HLT instruction) only, but the processor 210 cannot enter states C2~C4 without the support of the chipset 220. There are two control interfaces for low power states defined in the ACPI specification, such as hardware (e.g. processor registers P_LVL2, P_LVL3 in the chipset 220) or software (e.g. the _CST value of the operating system). The _CST value, which is used to declare the low power state of the processor 210, can be read by the operating system, and the number of the states of the processor(s) can be extended freely within the support of the _CST value. The operating system of the electronic system 200 may execute the instructions of the corresponding low power state by reading the address of the processor register, which is declared by the _CST value, so that the processor 210 may enter one of the low power states (e.g. state C1~C4). When the operating system of the electronic system 200 reads the instructions of the low power state, the power management unit 221 of the chipset 220 may assert related control signals correspondingly, such as STPCLK#, SLP#, DPSLP#, CPUSTP#, and DPRSLP#, thereby changing the power state of the processor 210 (details will be described later).

When the chipset 220 has received the instruction to control the processor 210 to enter state C2, the power management unit 221 may assert the signal STPCLK# (i.e. stop clock) to cut off connection of the core clock of the processor 210. When the chipset 220 has received the instruction to control the processor 210 to enter state C3, the power management unit 221 may assert the signals STPCLK#, SLP# (i.e. Sleep), DPSLP# (i.e. Deep Sleep), and CPUSTP# (i.e. CPU Stop). The signal DPSLP# may control the processor 210 to stop the operation of its phase loop lock (PLL), and the signal CPUSTP# may control the clock generator 240 to stop providing the external clock signal (e.g. clock signal BCLK) to the processor 210. When the chipset 220 has received the instruction to control the processor 210 to enter state C4, the power management unit 221 may further assert the signals DPRSLP# (i.e. Deeper Sleep) and DPSLPVR in addition to STPCLK#, SLP#, DPSLP#, and CPUSTP#, thereby notifying the processor 210 and the voltage regulator 230 to change their power states. When the processor 210 has received the signal DPRSLP#, the processor 210 may alternate its voltage identification code (VID), and the voltage regulator 230 may change the operating voltage VPP of the processor 210 according to the voltage identification code (VID) from the processor 210.

When the processor 210 is in state C3 or C4, the accessing of the bus master of the peripheral module 222 will be masked, and the processor 210 can only be awakened from state C3/C4 under the control of the power management unit 221. If the processor 210 is awakened from state C3, the processor 210 cannot work until the clock generator 240 and the PLL (not shown) of the processor 210 output a stable operating clock. If the processor 210 is awakened from state C4, the processor 210 cannot work until the operation voltage of the processor 210 is recovered in addition to the stable operating clock since the operation voltage of the processor 210 in state C4 is lower than that in state C3.

Figure 3:
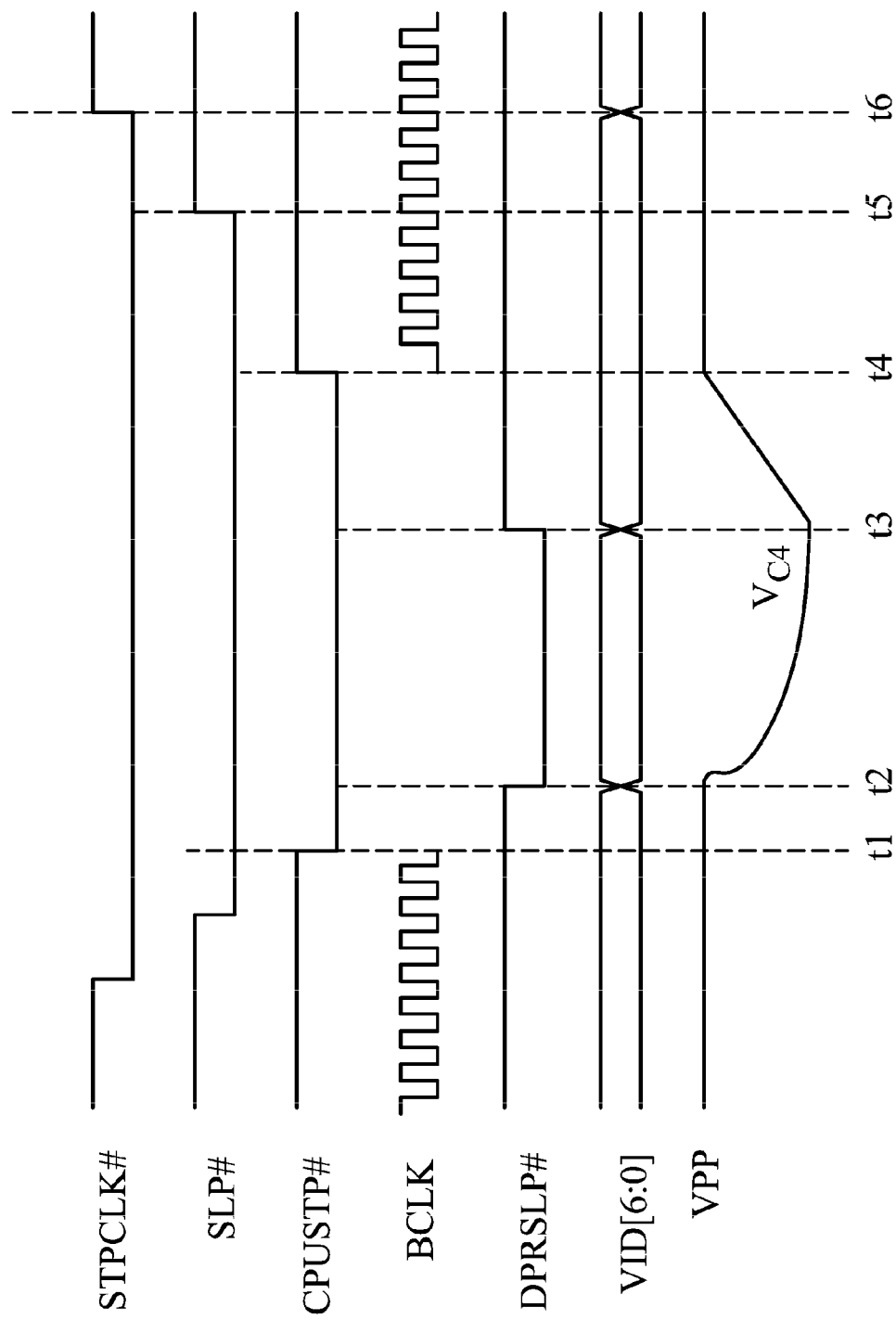
FIG. 3 is a timing chart illustrating the procedure for awakening the processor 210 from state C4 according to an embodiment of the invention.

FIG. 3 is a timing chart illustrating the procedure for awakening the processor 210 from state C4 according to an embodiment of the invention. As illustrated in FIG. 3, the processor 210 enters state C4 at time t2, and the voltage VPP of the processor 210 is gradually decreased until the operation voltage $V_{C4}$ of state C4 is reached. At time t3, the chipset 220 receives an awakening signal of an awakening event, wherein the awakening signal may be an interrupt signal from the peripheral components of the peripheral module 222, or a request signal from the bus master. The bus master may comprise, but not be limited to, the HD audio controller, PCI-E controller, PCI controller, USB controller, and SATA controller. Then, the power management unit 221 may de-assert the signal DPRSLP#, wherein the signal DPRSLP# is low active. Meanwhile, the processor 210 may alternate its voltage identification code VID, and the voltage regulator may adjust the voltage VPP of the processor 210 according to the alternated voltage identification code VID, wherein the voltage VPP is increased according to a slew rate (e.g. 10 mV/μsec), and the voltage VPP may reach the operation voltage $V_{C0}$ in the working state (state C0) at time t4. Accordingly, the required time for awakening the processor 210 to state C4 from state C3 is t4-3. It should be noted that state C4 is a deeper sleep state, and the operation voltage $V_{C4}$ of the processor 210 in state C4 is very low. In addition, the power management unit 221 may only de-assert the related control signals, such as CPUSTP#, SLP#, and STPCLK#, after the voltage of the processor 210 is recovered to the operation voltage $V_{C0}$, so that the processor 210 may go back to state C0.

Figure 4:
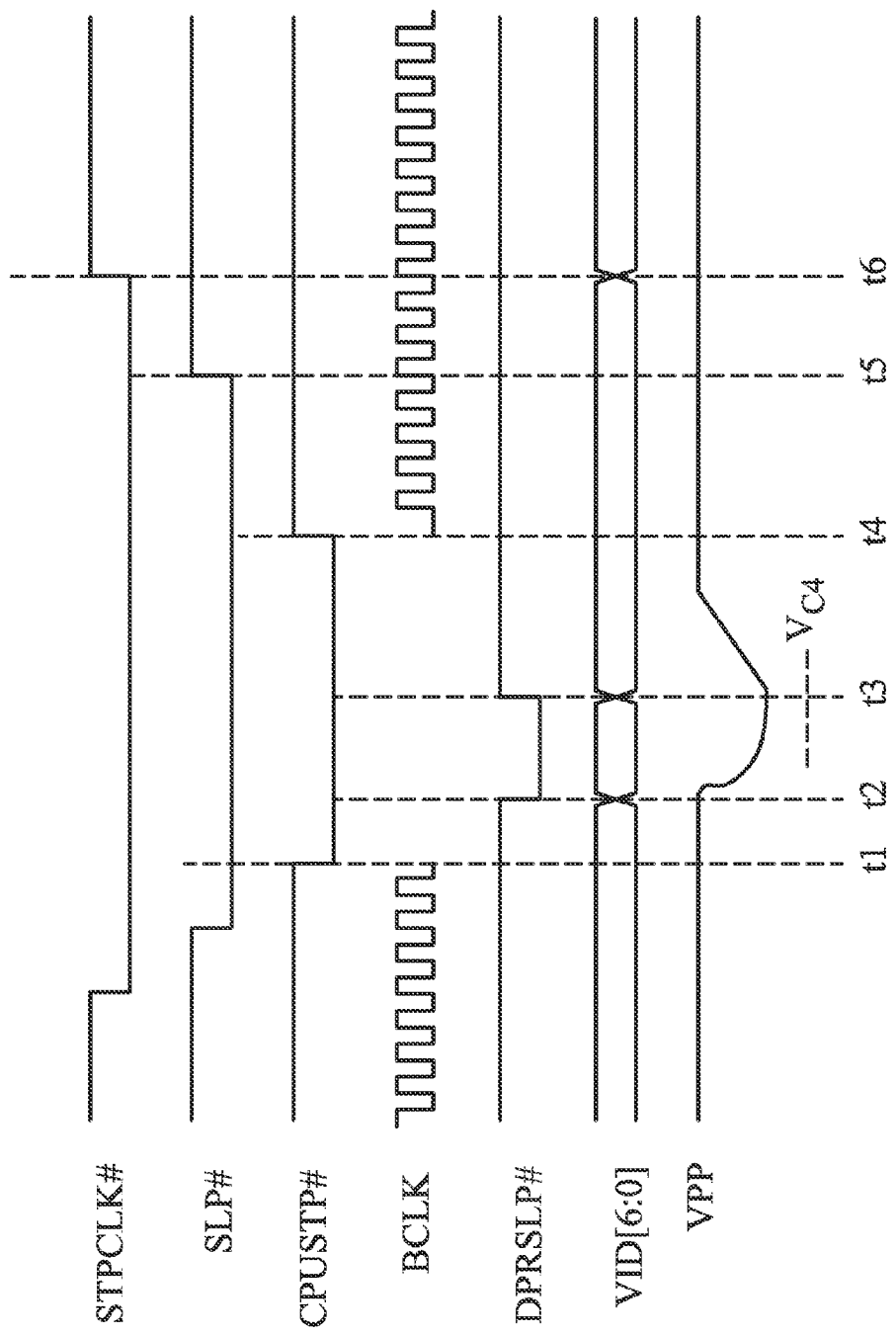
FIG. 4 is a timing chart illustrating the procedure of awakening the processor from state C4 in a conventional electronic system.

In another embodiment, the chipset 220 may receive an awakening event within a short time period after the signal DPRSLP# is asserted, and the voltage VPP of the processor 210 has not been decreased to the operation voltage $V_{C4}$ of state C4. FIG. 4 is a timing chart illustrating the procedure of awakening the processor from state C4 in a conventional electronic system. It should be noted that, since the power management unit of a conventional electronic system cannot obtain the current operation voltage of the processor, the power management unit may only wait for a sufficiently long, fixed time period (e.g. time period t4-t3), thereby ensuring that the operation voltage of the processor 210 has recovered to the operation voltage $V_{C0}$ of the working state (state C0), as illustrated in FIG. 4. The aforementioned example in FIG. 4 is one of the reasons for the reduction in system performance of the conventional electronic system.

Figure 5:
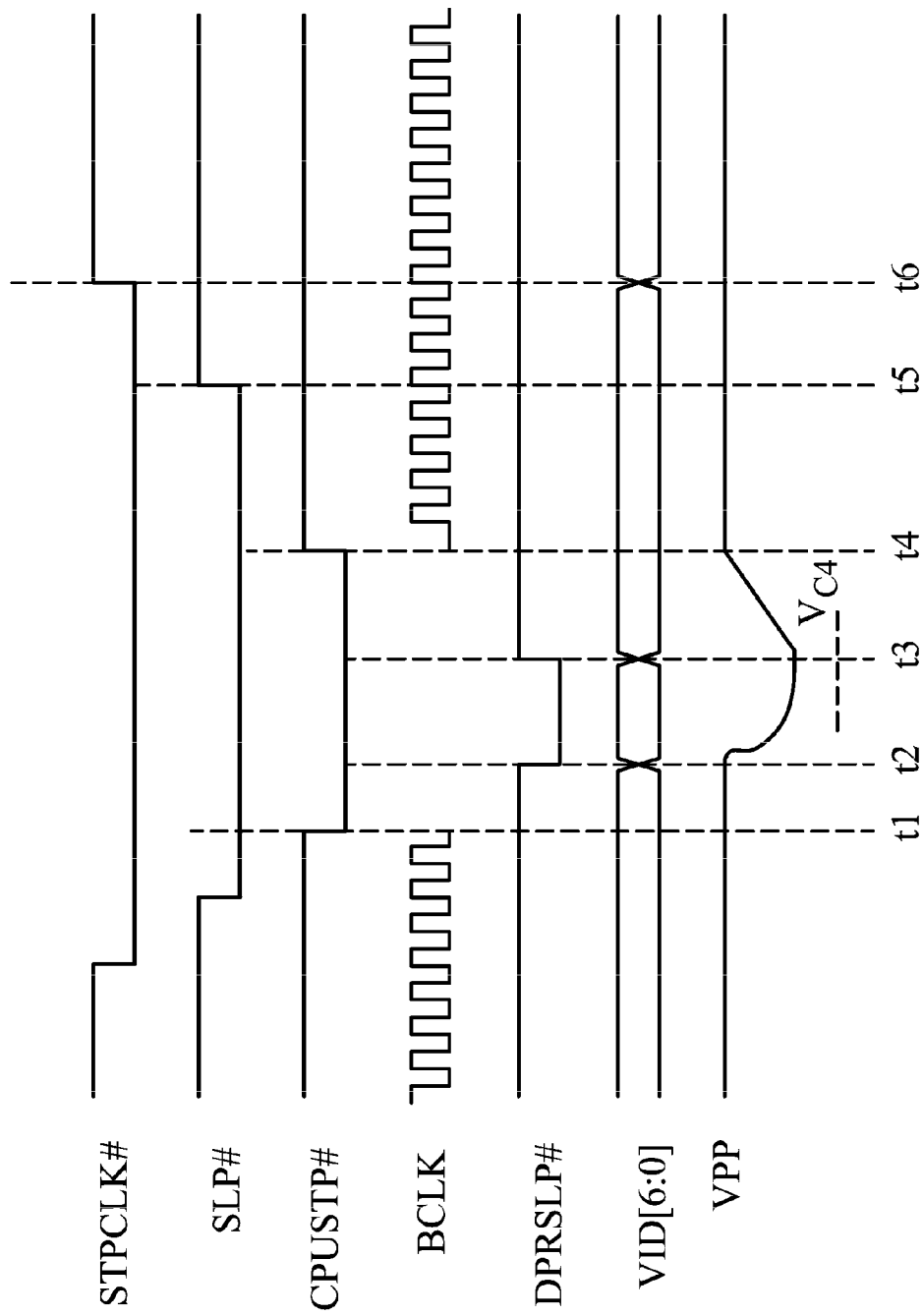
FIG. 5 is a timing chart illustrating the procedure of awakening the processor 210 from state C4 according to another embodiment of the invention.

FIG. 5 is a timing chart illustrating the procedure of awakening the processor 210 from state C4 according to another embodiment of the invention. Compared to the aforementioned embodiment in FIG. 4, the power management unit 221 of the invention may record an entry time point $T_{Entry}$ (e.g. time t2 in FIG. 5) at which the processor 210 enters state C4, and further record an exiting time point $T_{Exit}$ (e.g. time t3 in FIG. 5) at which an awakening event of the processor 210 occurs (i.e. at which the awakening event is received by the power management unit 221 and the processor 210). The power management unit 221 may further divide the staying time $T_{C4}$, during which the processor 210 stays in state C4, into several levels, and determine the wait time $T_{Waiting}$ of the processor 210 exiting state C4 to state C3 according to the staying time $T_{C4}$. Referring to both FIG. 4 and FIG. 5, it is appreciated that time t4 in FIG. 5 is significantly earlier than time t4 in FIG. 4 according to the examples of FIG. 4 and FIG. 5. In other words, the wait time of the processor 210 for going back to state C3 from state C4 can be significantly reduced in the invention, thereby reducing the awakening time of the processor 210 going back to state C0 from state C4 (e.g. time period t6-t3 in FIG. 5). The wait time $T_{Waiting}$ of the processor 210 for going back to state C3 from state C4 may become shorter in response to shorter staying time $T_{C4}$ during which the processor 210 stays in state C4. That is, when the user is using a USB camera or listening to high-definition audio, the invention may prevent the long delay caused by the processor 210 while being awakened to state C0 from state C4, thereby providing a better user experience.

Figure 6:
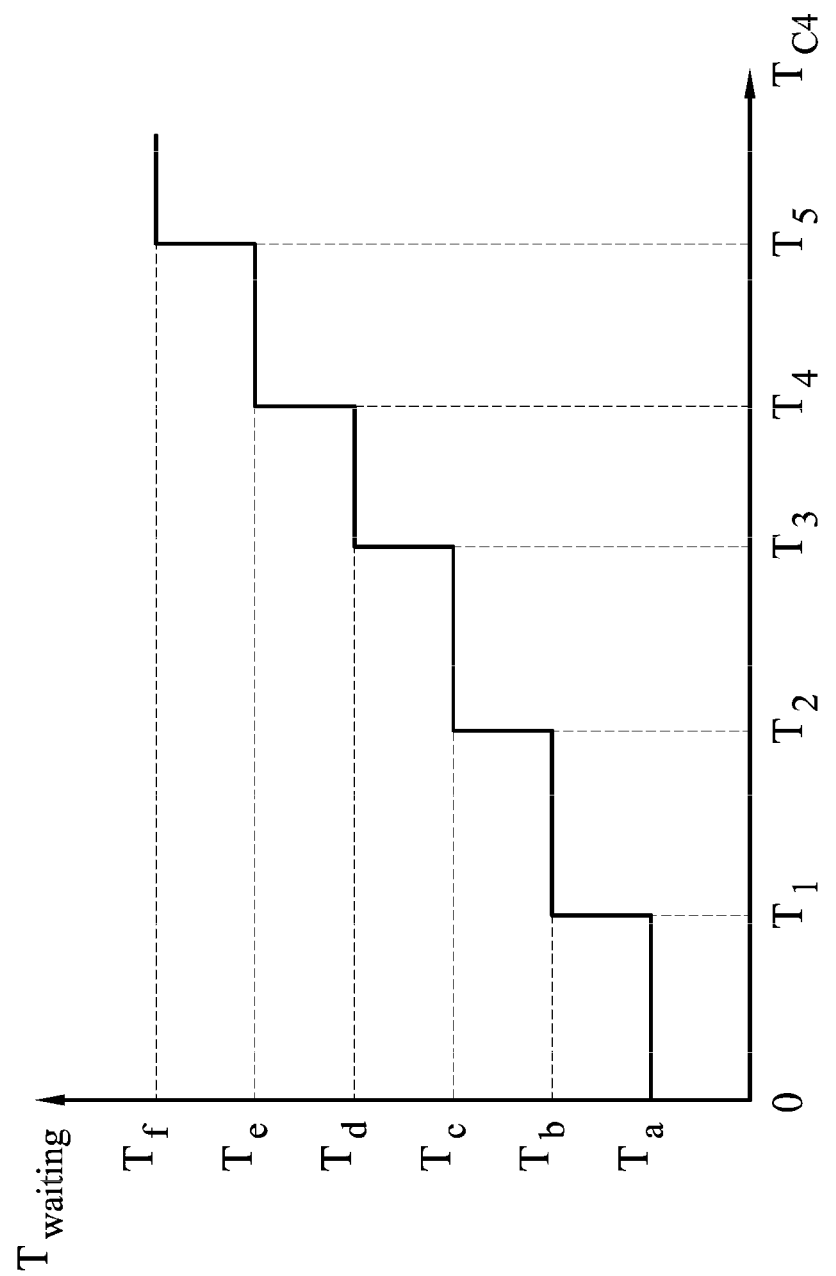
FIG. 6 is a diagram illustrating the mapping relationship between the staying time $T_{C4}$ and the wait time $T_{Waiting}$ in the power management unit 221 according to an embodiment of the invention.

FIG. 6 is a diagram illustrating the mapping relationship between the staying time $T_{C4}$ and the wait time $T_{Waiting}$ in the power management unit 221 according to an embodiment of the invention. In the aforementioned embodiment, for example, the power management unit 221 may divide the staying time $T_{C4}$ into 6 levels, as illustrated in FIG. 6. The calculation of the wait time $T_{Waiting}$ for the power management unit 221 can be expressed by the following equations:

if $T_{C4} < T_1$, $T_{Waiting} = T_a$;

else if $T_1 \leq T_{C4} < T_2$, $T_{waiting} = T_b$;

else if $T_2 \leq T_{C4} < T_3$, $T_{Waiting} = T_c$;

else if $T_3 \leq T_{C4} < T_4$, $T_{Waiting} = T_d$;

else if $T_4 \leq T_{C4} < T_5$, $T_{Waiting} = T_e$;

else if $T_{C4} \leq T_5$, $T_{Waiting} = T_f$;

wherein time $T_1 \sim T_5$ and $T_a \sim T_f$ are predefined values. In an embodiment, after measuring the voltage VPP of the processor 210 in a practical case, time $T_1 \sim T_5$ may be 8, 15, 25, 50 and 75 μs, and time $T_a \sim T_f$ may be 8, 10, 15, 20, 28, and 35 μs, respectively. It should be noted that the aforementioned time values can be tested and adjusted according to practical conditions, and the invention is not limited to the aforementioned values.

Figure 7A:
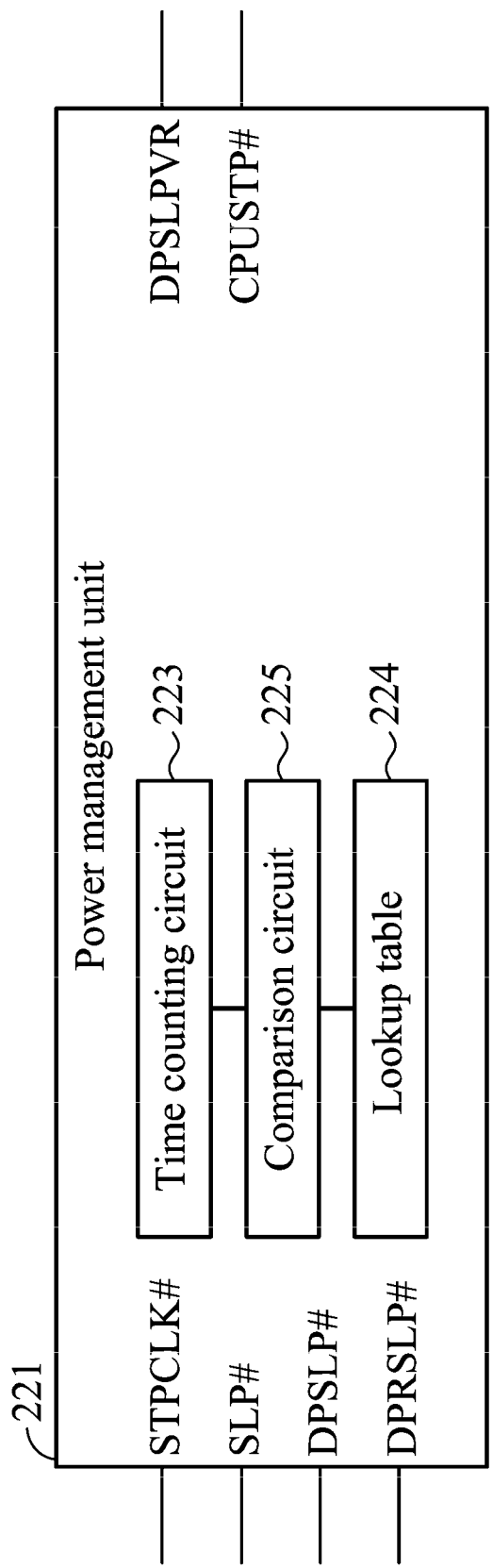
FIGS. 7A and 7B are schematic block diagrams of the power management unit 221 according to different embodiments of the invention.
Figure 7B:
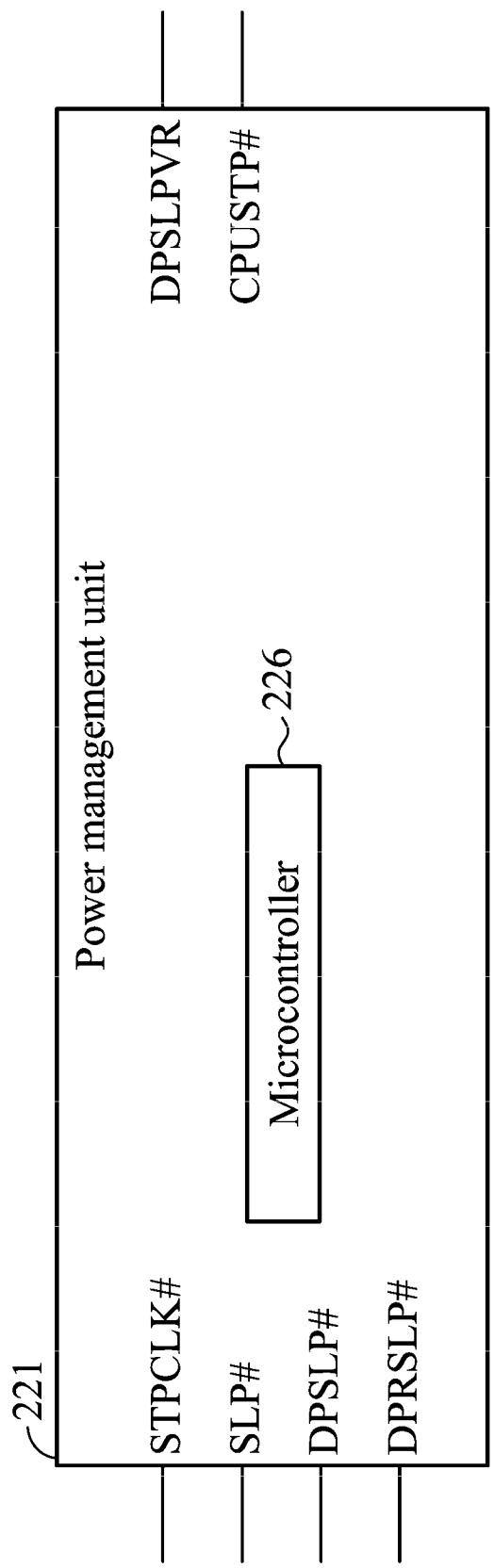

FIGS. 7A and 7B are schematic block diagrams of the power management unit 221 according to different embodiments of the invention. As illustrated in FIG. 7A, the power management unit 221 of the invention can be implemented by logic circuits, such as a time counting circuit 223, a lookup table 224, and a comparison circuit 225. The lookup table 224 stores the numeric values of time $T_1 \sim T_5$ and $T_a \sim T_f$, and the lookup table 224 can be implemented by a logic circuit (e.g. programmable logic device (PLD)), or a set of registers of the power management unit 221. The time counting circuit 223 may count the staying time $T_{C4}$ during which the processor 210 stays in state C4 (e.g. time period $T_{Exit}-T_{Entry}$). The comparison circuit 225 may compare the staying time $T_{C4}$ with time $T_1 \sim T_5$ stored in the lookup table 224 to obtain the corresponding wait time $T_{Waiting}$. In another embodiment, the aforementioned logic circuits can be implemented by a microcontroller 226 implemented in the power management unit 221, as illustrated in FIG. 7B. Accordingly, the performance of the computer system can be improved with a little extra hardware in the invention.

It should be noted that the invention can be applied to an x86 electronic system complying with the ACPI specification, which is capable of awakening the processor to the working state (e.g. state C0) or other low power states (e.g. states C1~C3) from state C4 (i.e. a very low power state having an operation voltage lower than that of other low power states). The invention can be also applied to other processors complying with other standards or non-x86 processors capable of exiting the low power state. Generally, the invention can be used when the processor having a first voltage at a low power state is awakened to a working state having a second voltage. That is, the wait time, after which the voltage of the processor has recovered to the operation voltage of the working state from that of the low power state, is determined by the staying time of the processor from the time point the processor enters the low power state till the time point the awakening event occurs. Specifically, the power management unit 221 may start to restore the clock of the processor after the wait time. Taking an x86 electronic system complying with the ACPI specification for example, the power management unit 221 may de-assert the signal CPUSTP# after the "wait time", thereby notifying the clock generator 240 to restore the external clock signal (e.g. clock signal BCLK) of the processor 210. In addition, the power management unit 221 may de-assert the signal DPSLP# after the wait time, thereby resetting the internal PLL of the processor 210. That is, time t4 in FIG. 5 has come earlier than time t4 in FIG. 4, so that the problem that the power management unit 221 has to wait for a sufficiently long, fixed time period before executing other operations since the voltage VPP of the processor 210 cannot be measured, can be resolved.

Figure 8:
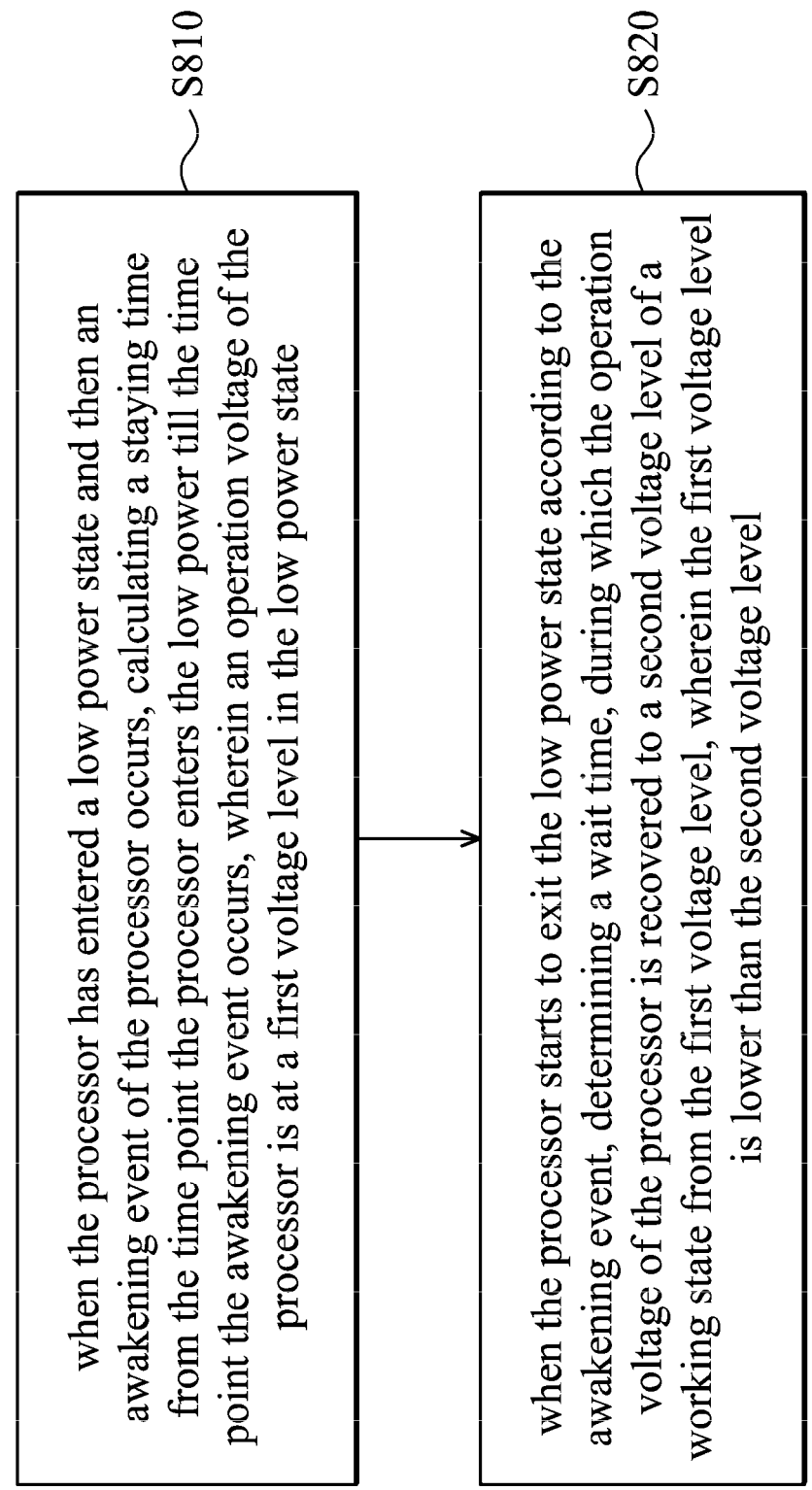
FIG. 8 is a flow chart of the power management method according to an embodiment of the invention.

FIG. 8 is a flow chart of the power management method according to an embodiment of the invention. Referring to FIG. 2 and FIG. 8, in step S810, when the processor 210 has entered a low power state (e.g. state C4 defined in the ACPI specification) and then an awakening event occurs, the power management unit 221 may calculate a staying time from the time point the processor 210 enters the low power state till the time point the awakening event occurs. In addition, the operation voltage of the processor 210 is at a first voltage level in the low power state, and at a second voltage level in the working state, wherein the first voltage level is lower than the second voltage level. The operations for calculating the wait time by the power management unit 221 can be referred to the embodiments of FIG. 5 and FIG. 6, and the details will not be described here.

In step S820, when the processor 210 starts to exit the low power state (e.g. state C4 defined in the ACPI specification) according to the awakening event, the power management unit 221 may determine a wait time, during which the operation voltage of the processor 210 is recovered to the second voltage level of the working state from the first voltage level of the low power state, according to the calculated staying time. It should be noted that the power management unit 221 may divide the staying time into several levels, and then map the calculated staying time to a wait time according to the corresponding level, thereby dynamically adjusting the wait time required for awakening the processor 210 of the electronic system 200 from state C4 to state C0 or C2.

Figure 9:
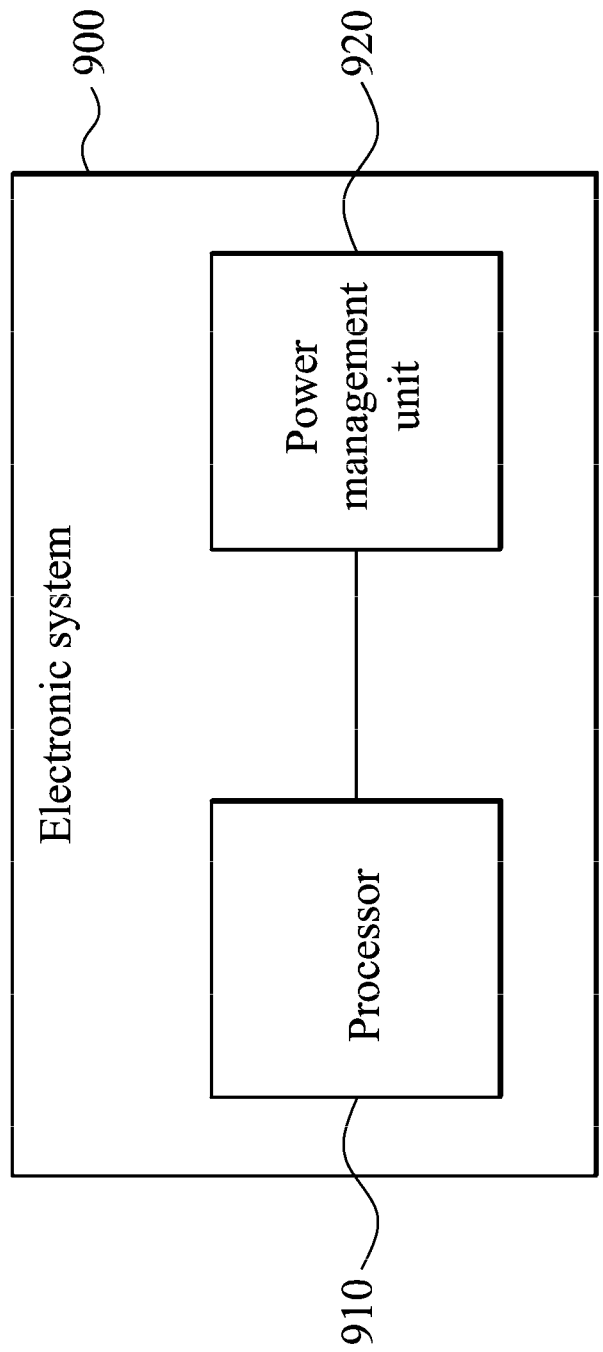
FIG. 9 is a simplified schematic block diagram of an electronic system 900 according to an embodiment of the invention.

FIG. 9 is a simplified schematic block diagram of an electronic system 900 according to an embodiment of the invention. In yet another embodiment, the invention can be applied to non-x86 system-on-chips (SOC), such as Advanced RISC Machines (ARM) SOCs, in addition to x86 computer systems The electronic system 900 is an SOC, which comprises a processor 910 and a power management unit 920. The invention can be applied to the power management unit 920. It should be noted that the power management unit 221 is integrated into the chipset 220 in the embodiments of x86 electronic systems. However, in the electronic system 900, the processor 910 and the power management unit 920 are integrated into an SOC. For example, the processor 910 may be a complex instruction set computer (CISC) processor (e.g. an x86 processor), or a reduced instruction set computer (RISC) processor (e.g. ARM, MIPS, Power processors). In an embodiment, the processor 910 is an ARM processor, and standby states, such as Standby WFI and Standby WFE, are defined in the ARM processor specification. The aforementioned standby states can be regarded as state C1 defined in the ACPI specification. Since the dynamic voltage frequency switch (DVFS) technology is used in the ARM processor to reduce the operation voltage of the ARM processor, a new state can be defined by integrating the standby states and the DVFS technology. In other words, the ARM processor may also adjust its operation voltage at the standby state (i.e. a low power state), and thus the invention can be applied to the ARM processor when the ARM processor exits the aforementioned standby state. It should be noted that the invention can be further applied to other SOCs (e.g. x86 SOCs complying with the ACPI specification) in addition to the ARM SOCs.

Figure 10:
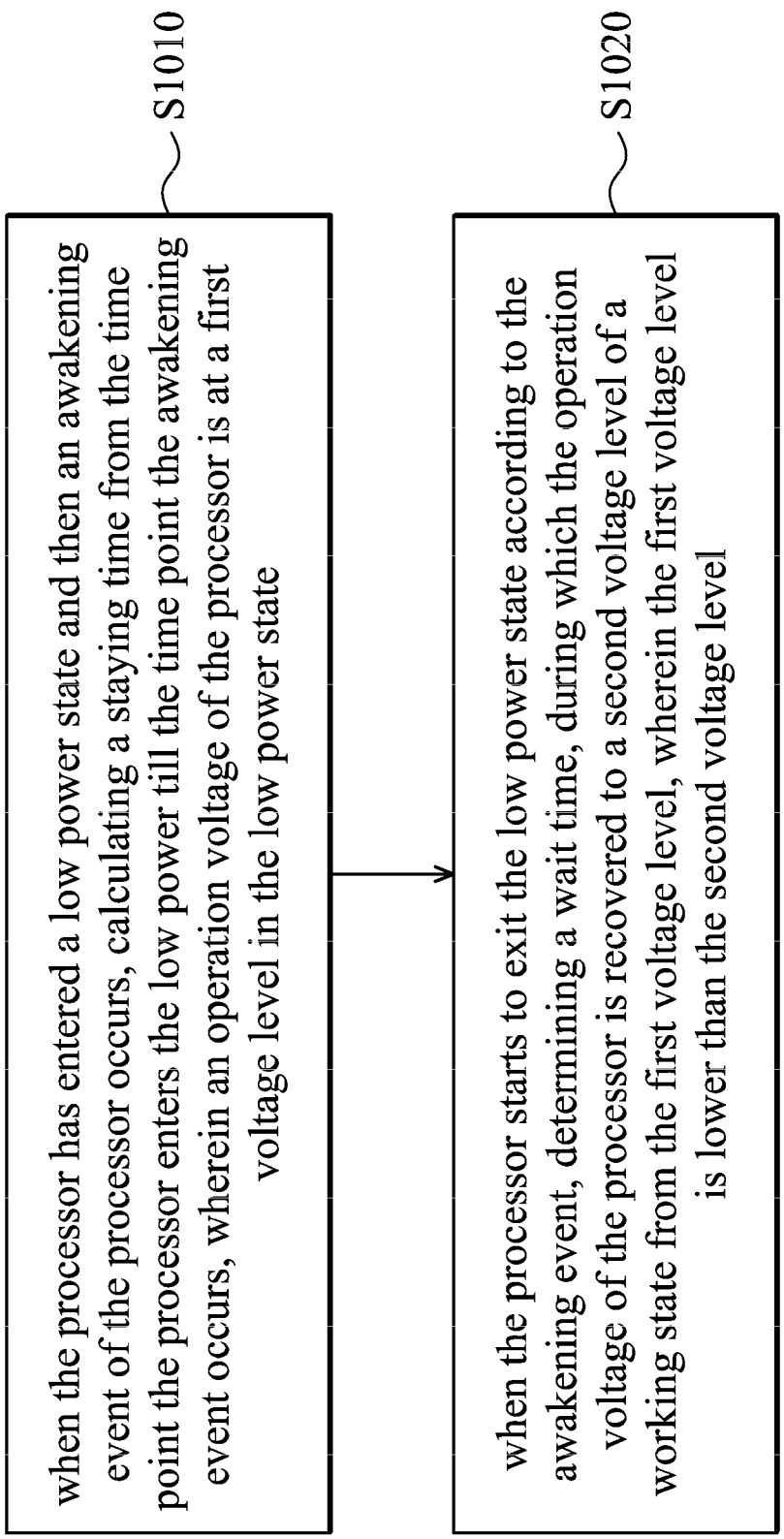
FIG. 10 is a flow chart of the power management method according to another embodiment of the invention.

FIG. 10 is a flow chart of the power management method according to another embodiment of the invention. Referring to FIG. 9 and FIG. 10, in step S1010, when the processor 910 has entered a low power state (e.g. Standby WFI state or Standby WFE state of the ARM processor) and an awakening event occurs, the power management unit 920 may calculate a staying time from the time point the processor 910 enters the low power state (e.g. Standby WFI or Standby WFE state) till the time point the awakening event occurs. The operation voltage of the processor 910 is at a first voltage level in the low power state and at a second voltage level in a working state, wherein the first voltage level is lower than the second voltage level. The procedure for calculating the staying time by the power management unit 920 is similar to the embodiments of FIG. 5 and FIG. 6, and the details will not be described here.

In step S1020, when the processor 910 starts to exit the low power state (e.g. Standby WFI or Standby WFE state of the ARM processor) according to the awakening event, the power management unit 920 may determine a wait time, during which the operation voltage of the processor 210 is recovered to the second voltage level of the working state from the first voltage level of the low power state, according to the calculated staying time. It should be noted that the power management unit 920 also divides the possible staying time into several levels in a similar way as described in the embodiment of FIG. 6, and then maps the calculated staying time to a wait time according to the corresponding level, thereby dynamically adjusting the required wait time for awakening the processor 910 of the electronic system 900 from the low power state to the working state.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method for use in an electronic system, wherein the electronic system comprises a processor, and a power management unit, the power management method comprising:

when the processor has entered a low power state and an awakening event of the processor occurs, calculating by the power management unit a staying time from the time point the processor entered the low power state till the time point the awakening event occurs, wherein an operation voltage of the processor is at a first voltage level in the low power state;

when the processor starts to exit the low power state according to the awakening event, determining by the power management unit a wait time, during which the operation voltage of the processor is recovered to a second voltage level of a working state from the first voltage level, according to the calculated staying time, wherein the first voltage level is lower than the second voltage level, and wherein the determining operation further comprises:

dividing the calculated staying time into a plurality of levels; and mapping the calculated staying time to the wait time according to one of the levels corresponding to the calculated staying time.

2. The power management method as claimed in claim 1, wherein the low power state is state C4 defined in the advanced configuration and power interface (ACPI) specification.

3. The power management method as claimed in claim 1, wherein the awakening event is a request signal sent from at least one bus master of the electronic system.

4. The power management method as claimed in claim 1, wherein the step of calculating the staying time further comprises:
  recalling an entry time point recorded when the processor entered enters the low power state;
  recording an exiting time point when the processor exits the low power state according to the awakening event; and
  calculating the staying time according to the recorded entry time point and the recorded exiting time point.

5. The power management method as claimed in claim 1, wherein the power management unit further comprises:
  a time counting circuit configured to calculate the staying time;
  a lookup table configured to store a plurality of levels of the staying time and a plurality of waiting time values, wherein each of the plurality of waiting time values corresponds to one of the levels of the staying time, respectively; and
  a comparison circuit configured to compare the calculated staying time with the plurality of levels of the staying time to obtain the wait time according to the lookup table.

6. The power management method as claimed in claim 5, wherein the lookup table is implemented by a set of registers of the power management unit.

7. The power management method as claimed in claim 1, further comprising:
  restoring a clock of the processor after the wait time.

8. An electronic system, comprising:
  a processor; and
  a power management unit, wherein when the processor has entered a low power state and an awakening event of the processor occurs, the power management unit calculates a staying time from the time point the processor entered the low power state till the time point the awakening event occurs, wherein an operation voltage of the processor is at a first voltage level in the low power state;
  wherein when the processor starts to exit the low power state according to the awakening event, the power management unit further determines a wait time, during which the operation voltage of the processor is recovered to a second voltage level of a working state from the first voltage level, according to the calculated staying time,
  wherein the first voltage level is lower than the second voltage level,
  wherein the power management unit determines the wait time by:
  dividing the calculated staying time into a plurality of levels; and
  mapping the calculated staying time to the wait time according to one of the levels corresponding to the calculated staying time.

9. The electronic system as claimed in claim 8, wherein the low power state is state C4 defined in the ACPI specification.

10. The electronic system as claimed in claim 8, wherein the low power state is Standby WFI state or Standby WFE state defined in the ARM processor specification.

11. The electronic system as claimed in claim 8, wherein the electronic system further comprises at least one bus master, and the awakening event is a request signal sent from the bus master.

12. The electronic system as claimed in claim 8, wherein the power management unit recalls an entry time point recorded when the processor entered the low power state, records an exiting time point when the processor exits the low power state according to the awakening event, and calculates the staying time according to the recorded entry time point and the recorded exiting time point.

13. The electronic system as claimed in claim 8, wherein the electronic system further comprises a clock generator coupled between the processor and the power management unit, and the power management unit further notifies the clock generator to restore an external clock of the processor after the wait time, and notifies a clock generator to restore an external clock of the processor after the wait time.

14. The electronic system as claimed in claim 8, wherein the electronic system further comprises a voltage regulator coupled between the processor and the power management unit, and the power management unit further controls the processor to enter the low power state by reducing the operation voltage of the processor to the first voltage level via the voltage regulator, and the power management unit further restores the operation voltage of the processor to the second voltage level from the first voltage level via the voltage regulator.

15. The electronic system as claimed in claim 8, wherein the processor is a complex instruction set computer (CISC) processor or a reduced instruction set computer (RISC) processor.

16. The electronic system as claimed in claim 8, wherein the power management unit further comprises:
  a time counting circuit configured to calculate the staying time;
  a lookup table configured to store a plurality of levels of the staying time and a plurality of waiting time values, wherein each of the plurality of waiting time values corresponds to one of the levels of the staying time, respectively; and
  a comparison circuit configured to compare the calculated staying time with the plurality of levels of the staying time to obtain the wait time according to the lookup table.

17. The electronic system as claimed in claim 16, wherein the lookup table is implemented by a logic circuit.

18. The electronic system as claimed in claim 16, wherein the lookup table is implemented by a set of registers of the power management unit.

* * * * *